United States Patent
Montinaro et al.

(10) Patent No.: US 12,062,819 B2
(45) Date of Patent: Aug. 13, 2024

(54) PROTECTION OF A METAL SUBSTRATE FOR SOLID OXIDE FUEL CELLS BY INKJET PRINTING

(71) Applicant: Solidpower S.p.A., Mezzolombardo (IT)

(72) Inventors: Dario Montinaro, Mezzolombardo (IT); Christian Menato, Mezzolombardo (IT)

(73) Assignee: SOLIDPOWER S.P.A., Mezzolombardo (IT)

( * ) Notice: Subject to any disclaimer, the term of this patent is extended or adjusted under 35 U.S.C. 154(b) by 355 days.

(21) Appl. No.: 17/049,273

(22) PCT Filed: Feb. 21, 2019

(86) PCT No.: PCT/IB2019/051426
§ 371 (c)(1),
(2) Date: Oct. 20, 2020

(87) PCT Pub. No.: WO2019/202413
PCT Pub. Date: Oct. 24, 2019

(65) Prior Publication Data
US 2021/0218037 A1    Jul. 15, 2021

(30) Foreign Application Priority Data
Apr. 20, 2018  (IT) ............... 102018000004765

(51) Int. Cl.
*H01M 8/0206* (2016.01)
*H01M 8/0215* (2016.01)
(Continued)

(52) U.S. Cl.
CPC ....... *H01M 8/0206* (2013.01); *H01M 8/0215* (2013.01); *H01M 8/0228* (2013.01);
(Continued)

(58) Field of Classification Search
CPC ............. H01M 8/0206; H01M 8/0215; H01M 8/0228; H01M 8/0247; H01M 8/0282;
(Continued)

(56) References Cited

U.S. PATENT DOCUMENTS

| | | | |
|---|---|---|---|
| 9,627,698 B2 | 4/2017 | Wuillemin | |
| 2005/0095483 A1* | 5/2005 | Song | C04B 35/42 264/618 |
| 2007/0287047 A1* | 12/2007 | Kaiser | H01M 8/0625 29/730 |

(Continued)

FOREIGN PATENT DOCUMENTS

| | | | | |
|---|---|---|---|---|
| DE | 102013205718 A1 * | 10/2013 | .......... | H01M 8/0206 |
| DE | 102013205718 A1 | 10/2013 | | |
| WO | 2004062890 A2 | 7/2004 | | |
| WO | 2018017537 A1 | 1/2018 | | |

OTHER PUBLICATIONS

English translation of DE-102013205718-A1 (Year: 2013).*
International Search Report for PCT/IB2019/051426 dated Apr. 15, 2019 (3 pages).

(Continued)

*Primary Examiner* — Ula C Ruddock
*Assistant Examiner* — Sarika Gupta
(74) *Attorney, Agent, or Firm* — Tutunjian & Bitetto, P.C.

(57) ABSTRACT

The present invention regards a method for depositing a material layer on a metallic interconnector or support for fuel cells or cells for electrolysis. A deposition method is provided which allows applying a protective ceramic material layer on metallic supports of complex geometry, such as the metallic interconnectors of the fuel cells.

15 Claims, 3 Drawing Sheets

(51) Int. Cl.
  *H01M 8/0228*  (2016.01)
  *H01M 8/0247*  (2016.01)
  *H01M 8/0282*  (2016.01)
  *H01M 8/12*  (2016.01)
  *H01M 8/1213*  (2016.01)

(52) U.S. Cl.
  CPC ....... *H01M 8/0247* (2013.01); *H01M 8/0282* (2013.01); *H01M 8/1213* (2013.01); *H01M 2008/1293* (2013.01); *Y02E 60/50* (2013.01)

(58) Field of Classification Search
  CPC ....... H01M 8/1213; H01M 2008/1293; H01M 8/0286; Y02E 60/36; Y02E 60/50; B33Y 10/00; C25B 9/65
  See application file for complete search history.

(56) References Cited

U.S. PATENT DOCUMENTS

| | | | | |
|---|---|---|---|---|
| 2009/0311572 | A1* | 12/2009 | Roy .................... | H01M 8/0232 29/623.5 |
| 2013/0230644 | A1* | 9/2013 | Armstrong .......... | H01M 8/0245 419/62 |
| 2013/0230792 | A1* | 9/2013 | Wilson ................ | C23C 4/11 429/509 |

OTHER PUBLICATIONS

Towne et al., "Fabrication of Polymer Electrolyte Membrane Fue Cell MEAs utilizing inkjet print technology", Journal of Power Sources, vol. 171, Jul. 2007, pp. 575-584.

* cited by examiner

PROTECTION OF A METAL SUBSTRATE FOR SOLID OXIDE FUEL CELLS BY INKJET PRINTING

TECHNICAL FIELD OF THE INVENTION

The present invention regards a method for depositing a material layer on a metallic support for solid oxide cells, such as fuel cells or cells for high-temperature electrolysis, and the metallic support obtained with such method.

According to one version of the present invention such material layer is a protective material, in particular a protective ceramic material.

STATE OF THE PRIOR ART

As is known, the fuel cells or the cells for electrolysis are electrochemical devices that directly convert the chemical energy of an oxidation reaction into electrical energy.

The typical structure of a fuel cell comprises two porous electrodes, anode and cathode, separated by a membrane, or electrolyte, which allows ionic transport.

There are different types of fuel cells, which are essentially different with regard to the type of membrane, and consequently for the operating temperature.

In particular, the solid oxide fuel cells (SOFC) comprise an oxygen-ion conductor ceramic membrane. The operating temperature of this cell type varies between 600° C. and 900° C.

The solid oxide cells are typically employed in the construction of fuel stacks for the cogeneration of electrical and thermal energy, for both mobile and stationary applications and in the production of fuel gases by means of electrolysis.

In such cells, the anode is usually constituted by a mixture of nickel oxide and zirconium stabilized with yttrium ("YSZ"), the electrolyte is constituted by zirconium stabilized with yttrium ("YSZ"), while the cathode is generally constituted by mixed oxides with structure of perovskite type, for example the most common are indicated with "LSCF" and "LSM".

The solid oxide cells can have both planar and tubular configuration.

In addition, there are different types of cells in relation to the element of the cell that ensure the mechanical support.

There are in fact cells supported by the electrolyte, or cells supported by the electrode (anode or cathode), or cells with metallic support.

The cells are normally produced starting from raw materials in powder form.

The ceramic and/or metallic powders are deposited according to the shape that one wishes to confer to the cell, and subsequently they are sintered at high temperature—typically between 1000° C. and 1400° C.—in order to obtain a compact manufactured item.

The sintering of completely ceramic cells can provide for various stages of sintering in air.

It must also be observed that the so-called stack is normally composed of a certain number of cells arranged in series, connected to each other by means of metallic interconnectors that are flat or even have complex geometry.

The combination of a metallic interconnector and a cell is normally termed "single repeating element" (SRE).

In order to prevent the direct combustion of the fuel with the air within the stack, it is necessary to separate the two gaseous atmospheres by means of a sealant material. Such sealant material is applied on the perimeter of the cell, at the interface between cell and steel of the interconnector, and at the steel-steel interface between two contiguous interconnectors.

The sealant material is generally a ceramic material, a vitreous material or a glass-ceramic material.

The high operating temperatures cause the oxidation of these metallic components, with reduction of the electrical conductivity; in addition, there is a release of volatile elements which damage the catalyst properties of the cells.

The metallic elements released by the steel can also react with the sealant material, causing a degradation or breakage of the stack.

The high-temperature oxidation of the interconnectors can generally be limited by means of the application, on the metal, of a protective ceramic coating. Such coating must have a heat expansion coefficient compatible with the materials of the interconnector and of the cell. The coating must also ensure the electrical conductivity at the interface between steel of the interconnector and the cell, in particular between steel of the interconnector and air-side electrode. The electrical conductivity is instead not necessary in the area of the interconnector which is not in contact with the cell.

Such coating is typically composed of cobalt and manganese oxides.

The coating protects the metal from the oxidizing atmosphere, while maintaining a good electrical conductivity.

The application of this coating on an interconnector with simple geometry can be carried out by means of conventional technologies, e.g. screen printing, dip coating, i.e. coating via immersion, and other types.

In this case, the single metallic component can be managed with relative simplicity according to the most appropriate temperature and atmospheric conditions set by the process.

With regard to the interconnectors, and if planar surfaces are to be covered, the relatively simple geometry allows coating the metal by using suitable ceramic coatings with conventional methods.

Instead, in the case of metallic interconnectors with more or less complex three-dimensional surfaces, some areas of the interconnector—indeed due to their three-dimensional geometry—can be hard to access with a coating employing conventional deposition technologies.

Various conventional technologies are known for depositing ceramic coatings on metallic interconnectors for SOFC stacks.

A first technology provides for applying a protective layer by means of cold spraying. This method provides for nebulizing, by means of compressed air, an ink containing a very diluted quantity of ceramic powder. Even if this method is relatively simple and does not require large investments, it does not allow obtaining a high resolution, so that it is not possible to selectively cover some more complex part of the interconnector without having to mask the area that must remain uncovered. If it is desired to cover the surface with materials of different composition, it is necessary to carry out successive depositions, each time masking surfaces that must not be covered. This method is in fact more commonly applied when a uniform coating is requested that is constituted by only one material, generally on wide surfaces with simple geometry.

This method is also characterized by a waste of material, which can exceed 70% (Overspray).

A second technology provides for depositing the material by means of plasma spray (Thermal Spray). This method consists of spraying molten particles on a substrate. As in the case of cold spraying, this method is not very suitable for obtaining a good resolution and it is therefore necessary to mask the piece if it is desired to cover with more than one material or if it is desired to leave some areas uncovered.

A third technology provides for depositing the material by means of immersion in a suspension containing the ceramic material (dip coating). After having been dipped, the substrate is slowly extracted from the suspension, allowing the fluid to flow downward, leaving a thin ink layer. This method cannot be applied on three-dimensional surfaces which do not allow the flow of the fluid along the vertical axis, such as concave surfaces or cavities. If the substrate has a hollow three-dimensional structure, it is necessary to close the access channels in order to prevent the penetration of the fluid therein. Nevertheless, also this method has a poor resolution and it is necessary to mask the areas that must not be covered or which must be covered with another material in a new deposition step.

A fourth deposition technique consists of applying the protective coating by means of screen printing. This technique consists of pressing the ink through a polymer fabric with geometry corresponding to the image to be printed. This technique allows obtaining a good resolution and it is not necessary to mask the areas that must remain uncovered. The technique is however limited to planar surfaces and does not allow accessing small channels or three-dimensional structures.

A fifth deposition technique consists of applying the protective coating by means of electrochemical deposition. In this case, the piece is immersed in a saline solution containing the precursor of the material that is deposited on the metal by means of the application of a potential. On such matter, see the USA patent application published with number U.S. Pat. No. 9,627,698.

This method allows effectively coating three-dimensional surfaces, also complex surfaces, but limits the selection of the materials to the elements that can be deposited through electrochemical deposition and can only be applied on conductive surfaces. Also with this method, it is necessary to mask the surfaces that must not be covered.

SUMMARY OF THE INVENTION

One object of the present invention is to improve the state of the art.

Another object of the present invention is to provide a deposition method which allows applying a protective ceramic material layer on metallic supports of complex geometry, such as the metallic interconnectors of the fuel cells.

Another object of the present invention is to provide a deposition method as indicated above which also allows simultaneously depositing multiple materials on an interconnector, so as to cover different areas of the interconnector itself without having to mask the surfaces that must not be covered.

Another object of the present invention is to provide a method as stated above that allows applying layers with high resolution and only on the surface to be covered, drastically reducing the waste of material.

Another object of the present invention is to provide a deposition method that allows depositing successive thin layers of different composition in order to create a composition gradient within the protective coating.

Another object of the present invention is to provide a method for depositing a protective layer on an interconnector for protecting the metal of the matter from high-temperature oxidation, ensuring a low electrical resistance to contact with the electrodes.

Another object of the present invention is to provide a method for depositing a protective layer for protecting the air-electrode from evaporation or diffusion of elements released by the metal constituting the interconnector.

Another object of the present invention is to provide a method for depositing a protective layer for protecting the sealant material, typically a glass or a glass-ceramic, from the reaction with the elements constituting the metallic interconnector.

These and other objects are achieved by the method for depositing a material layer on a metallic support for fuel cells according to the present application.

The present application refers to preferred and advantageous embodiments of the invention.

BRIEF DESCRIPTION OF THE DRAWINGS

Other characteristics and advantages of the invention will be more evident from the description of an embodiment of a method for depositing a material layer on a metallic support for solid oxide cells, as well as an interconnector obtained with one such method, illustrated as a non-limiting example in the set of drawings in which.

In the enclosed drawings, equivalent parts or components are marked with the same reference numbers.

DETAILED DESCRIPTION OF EMBODIMENT OF THE INVENTION

Figure 1:
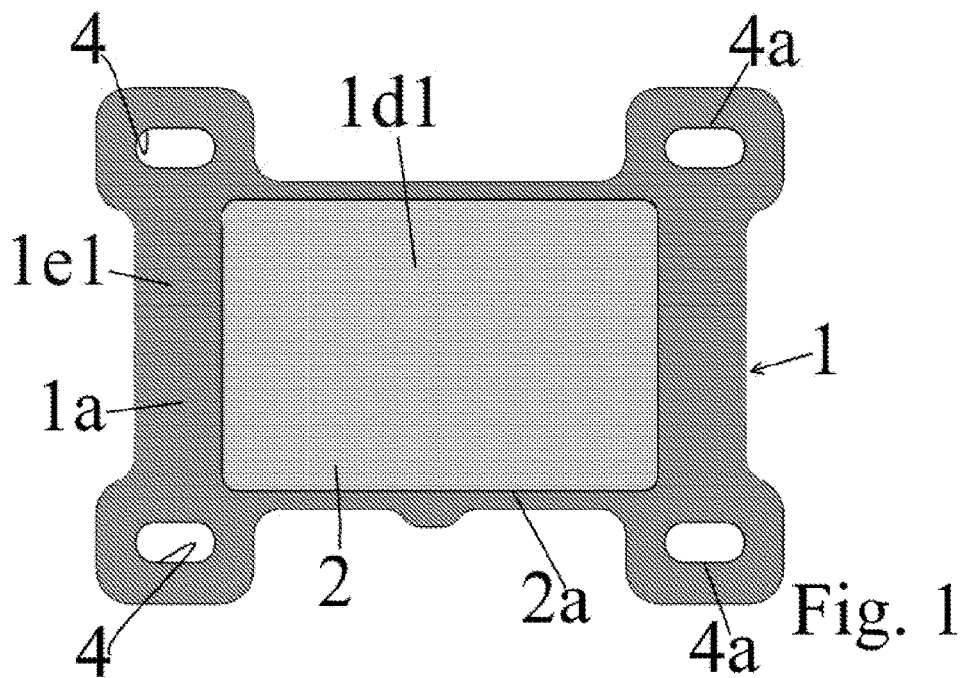
FIGS. 1 and 2 illustrate respective faces of an interconnector.

With reference to the enclosed figures, reference number 1 overall indicates a metallic interconnector or support of a fuel stack.

The metallic support 1 can be made of steel, if desired in ferritic steel containing a certain percentage of chromium, e.g. 22%.

The selection of this material is in any case non-limiting for the purposes of the present invention.

One such interconnector can for example be as described in the patent application published with number U.S. Pat. No. 9,627,698.

More particularly, the interconnector 1 can have a substantially plate-like configuration with thickness equal to about 0.5-5 mm.

In addition, the interconnector 1 can comprise a first side or first surface 1*a* or anode during use set to come into contact, at a respective intermediate portion 1*d*1, with the fuel and a second side or second surface 1*b* during use set to come into contact with air. The second side or second surface 1*b* is during use not in contact with the electrodes of the stack at a respective edge portion 1*e*2, while the surface of the crests 7 of the zone 5, which will be better described hereinbelow, is in contact with the cathode.

The interconnector 1 can comprise an intermediate portion 1d1, 1d2, for example with circular, square or rectangular border and an edge portion 1e1, 1e2, e.g. annular, extended around the intermediate portion 1d1, 1d2. The edge portion 1e1, 1e2 can have edge zones 1f, if desired projecting, for example four edge zones 1f. The surface 1e1 of the side 1a is during use set to come into contact with air.

First of all, relative to the fuel side 1a of the interconnector 1 (see FIG. 1), the latter or better yet the zone of such side 1a belonging to the intermediate portion 1d1 comprises a contact area 2 on which, during use, the fuel cell is positioned on the side exposed to the fuel. This area 2 has the function of electrically connecting the fuel-electrode to the metal of the interconnector 1 and of collecting the current generated by the oxidation reaction of the fuel in the cell.

The contact area 2 can have geometry, e.g. with circular, square or rectangular border. This area 2 can have grid-like structure that is rather complex.

In accordance with the present invention, this area 2 is preferably maintained not coated or it is covered, preferably entirely, with a metallic or ceramic layer that has electrical conductor properties, e.g. with thickness between 1 and 20 micrometers, preferably 10 micrometers. Such layer is for example a thin layer of nickel or of an oxide such as SrTiO3 or Co2MnO4.

At the perimeter 2a of such contact area 2, a first cord or layer of vitreous sealant 8 can be applied, preferably continuous and annular and which serves to seal the interface between the metal of the interconnector 1 and the edge of the cell that is positioned on such contact area 2. The cord or layer of sealant 8 can have a thickness for example between about 50 and about 200 micron, if desired about 100 micron. Such cord 8 can for example be applied via screen printing or via extrusion, e.g. by syringe.

The area of the perimeter 2a, on which the sealant to the cell edge is deposited, can be covered by a first intermediate layer, e.g. with thickness equal to about 1-20 micrometers made with an insulating material, for example identical to that used for the entire the surface 1e1, or with an insulating material dedicated for the interface between metal and glass. In such case, the first intermediate layer would be placed between the interconnector and the cord or layer of sealant 8.

Such perimeter 2a can be coated with at least one ceramic insulating layer which can be constituted by a glass-ceramic material, by aluminum oxide, zirconium oxide or by a mixture of such materials.

The interconnector then delimits multiple through slots or holes 4, e.g. four holes 4, each at a respective edge zone if of the interconnector 1, which serve for the passage of the fuel through the stack.

In order to prevent the diffusion of the fuel into the air compartment, it is possible to seal these holes 4, applying a second cord of sealant material 9, preferably continuous and annular, around or on the perimeter or on the ring zone 4a delimiting each hole 4 and between one interconnector and the next. The cord of sealant material 9 can have a thickness between about 0.2 and about 0.8 mm, if desired equal to about 0.5-0.6 mm. Such cord 9 can be applied, if desired, via extrusion, e.g. by syringe, or by means of screen-printed preforms.

In such case, the interface between metal of the interconnector 1 and sealant can be coated with a glass-ceramic material, with aluminum oxide, zirconium oxide or with a mixture of these materials.

The ring zone 4a or in any case an annular zone around one or all the holes 4 can be drawn or in any case in relief from the part of the air side 1b and flat or recessed from the part of the fuel side 1a. This drawing allows reducing the gap between the rings of two interconnectors 1 placed in series or in succession, thus reducing the thickness of the cord necessary for the sealant.

The cord of sealant material 9, if provided, is applied on the fuel side 1a (non-drawn ring), but it could also be deposited on the other side 1b.

The area around the holes 4a on which the sealant is deposited can be covered with a material identical to that used for the entire area exposed to air, or with a dedicated material at the interface between the metal of the interconnector 1 and glass.

Figure 2:
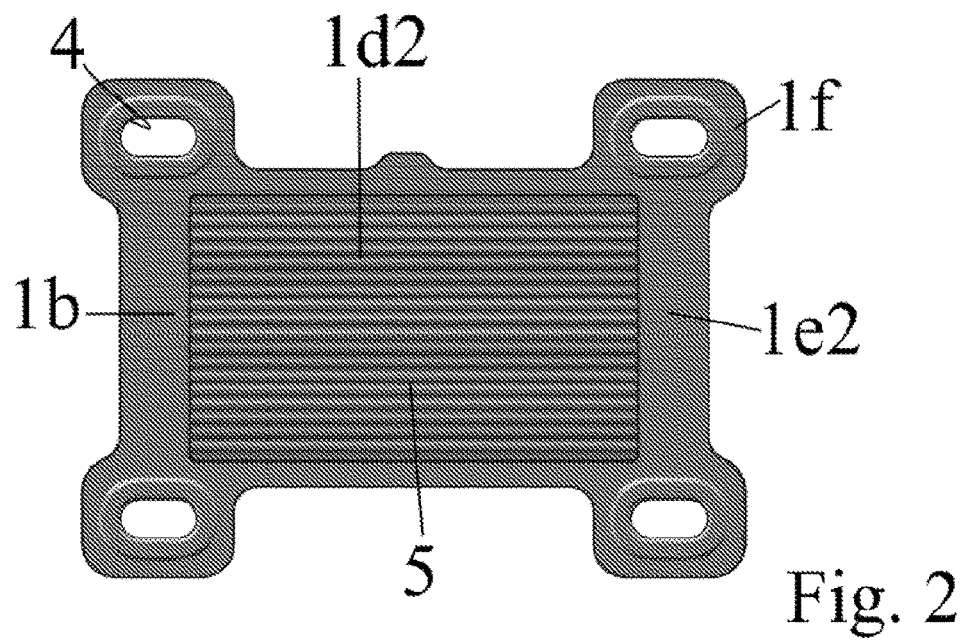
Figure 3:
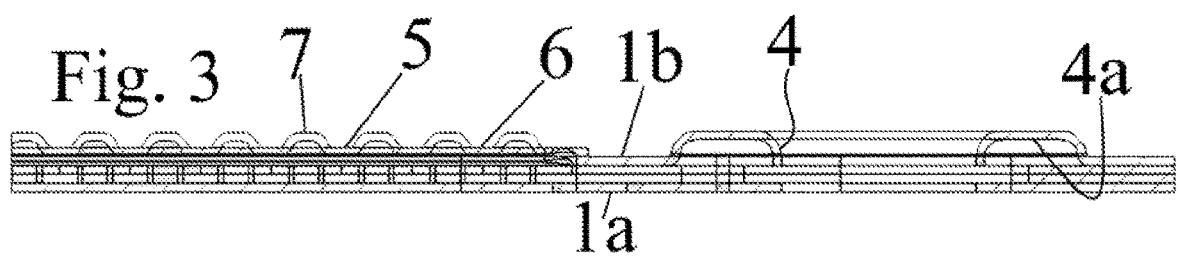
FIG. 3 is a side view with transparent parts of the interconnector of FIG. 1.
Figure 4:
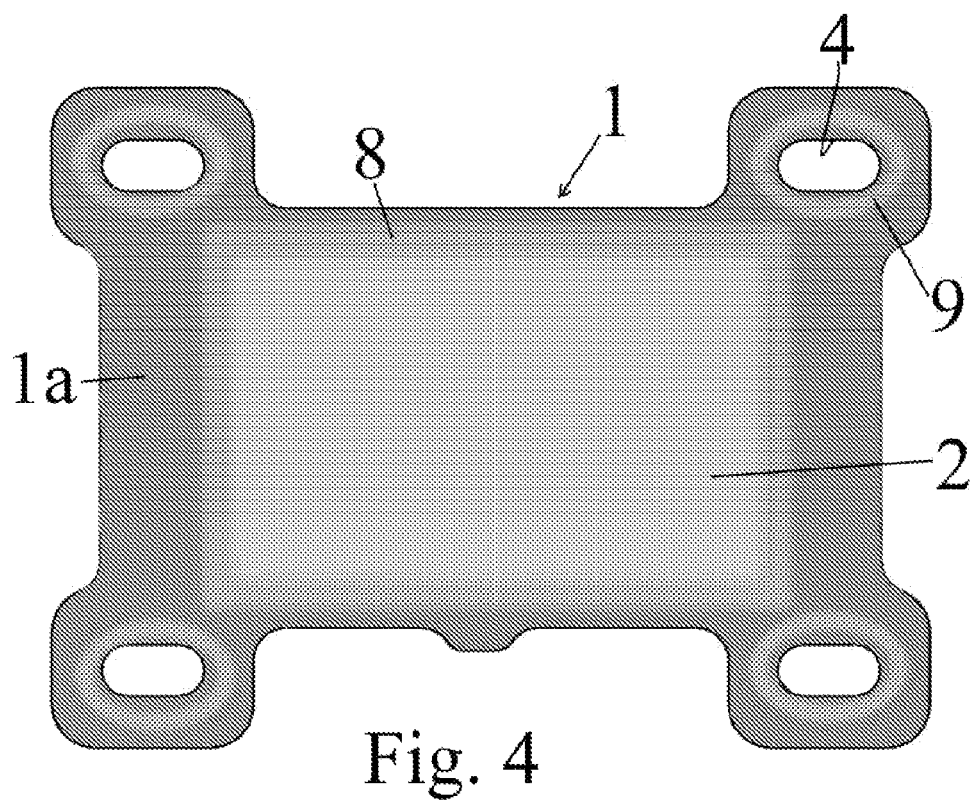
FIGS. 4 and 5 illustrate respective faces of an interconnector according to the present invention and treated with a method in accordance with the present invention.
Figure 5:
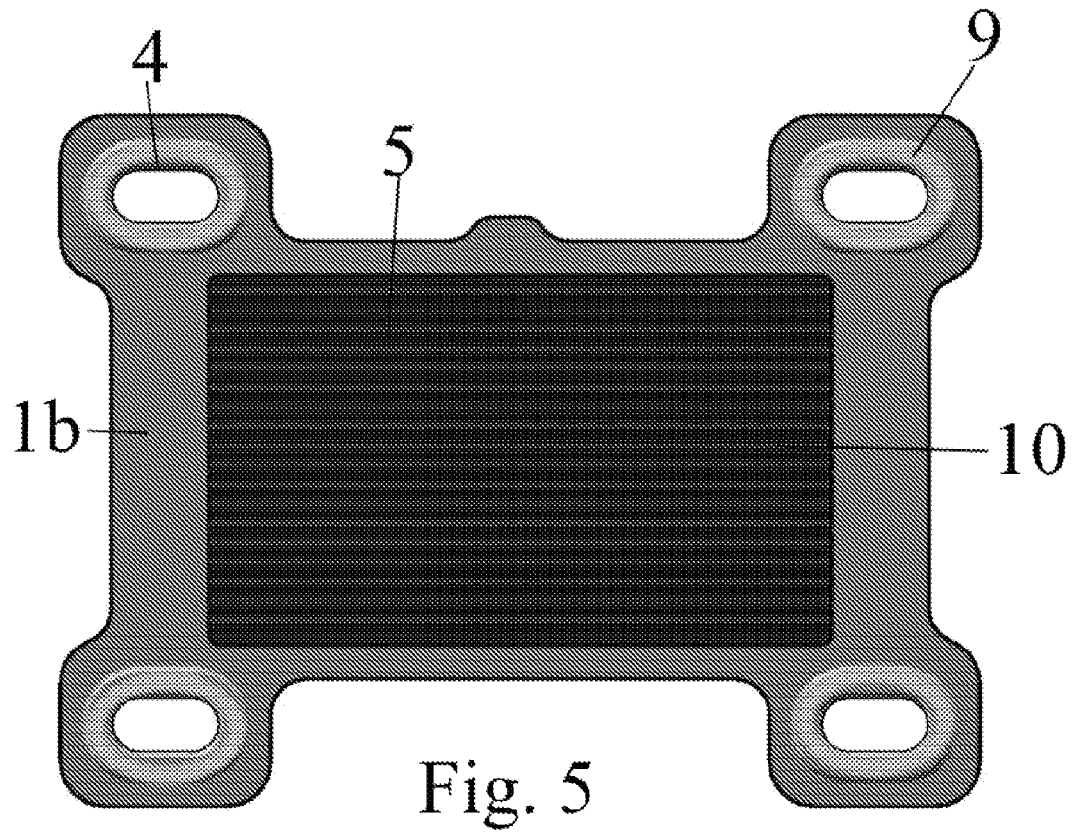

With regard instead to the air side 1b of the interconnector 1 (see FIGS. 2, 3 and 5), this or better yet the zone of such side 1b belonging to the intermediate portion 1d2 comprises a channel-like or corrugated structure 5 for the distribution of the air on the surface of the electrode.

In particular, this structure is constituted by crests 7 which come into contact with the air-electrode alternated with channels 6 which serve for the distribution of air between the metal of the interconnector 1 and the electrode. More particularly, the air distribution channels 6 are not in contact with the electrode, while the crests 7 are in contact therewith.

This structure with crests 7 and channels 6 can be entirely printed or coated with a layer 10 of ink with electrical conductor and anti-corrosive properties, such as an oxide of spinel type such as $CuMn_2O_4$ or $Co_2MnO_4$ or an oxide of perovskite type such as $LaMnO_3$ or $LaCrO_3$.

Figure 6:
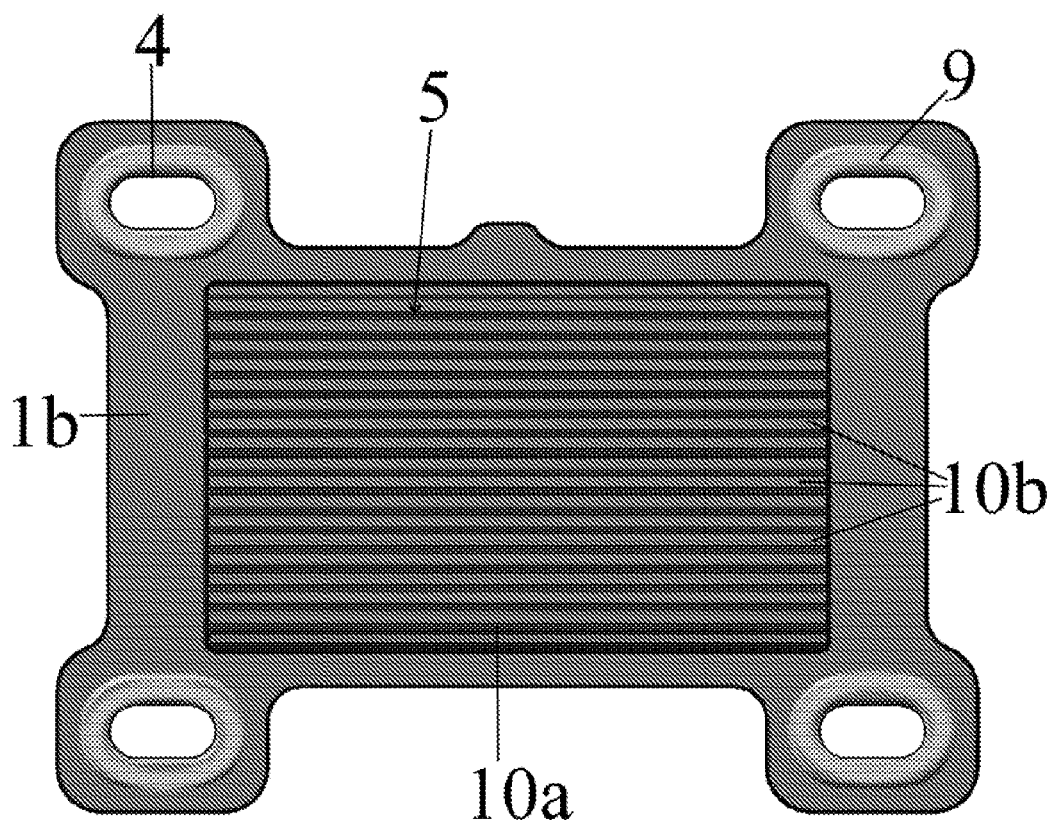
FIG. 6 illustrate a respective face or air side of an interconnector according to the present invention, treated with another method in accordance with the present invention.

Alternatively, as illustrated in FIG. 6, the crests 7 can be printed or coated with a conductive material layer 10a as indicated above and the channels 6 with an insulating material layer 10b, such as glass-ceramic or aluminum oxide, zirconium oxide or a mixture of these materials.

In addition, at the interface between the metal of the interconnector 1 and the printed conductive layer 10, 10a it is possible to apply one or more thin layers of a material which becomes conductive by reaction with the steel at high temperature. Such thin layers have the function of modifying the surface of the steel and improving the adhesion of the conductive layer thereon. In such case, this intermediate layer would be placed between the interconnector and the printed conductive layer. Such layer can for example be constituted by a lanthanum precursor which, by reaction with the chromium of the steel, forms a thin layer of $LaCrO_3$.

A ceramic insulating material can be printed, by means of inkjet printing, over the entire area of the interconnector 1 that is not in contact with the air or fuel electrodes.

In addition, a conductive ceramic or metallic material can be printed, by means of inkjet printing, on the area of the interconnector 1 which is contact with the electrodes air or fuel.

In substance, the entire area of the interconnector 1, except for the contact area 2 and the crests 7 of the corrugated structure 5 can be coated with a ceramic insulating material, such as a glass-ceramic, aluminum oxide, zirconium oxide or a mixture of these materials.

Preferably, but not exclusively, the metallic interconnector 1 and the layers of protective material are co-sintered at high temperature in a single production stage.

According to one version of the present invention, the deposition method can comprise a step for preparing at least one surface 1a, 1b of the metallic support 1.

In particular, such preparation step can consist of washing the surface 1a and/or 1b the metallic support 1 with solvents, acids, or other products suitable for eliminating all the impurities from the entire surface 1a and 1b of the metallic support 1.

More particularly, the metallic support 1 can be washed with a surfactant bath in order to remove possible residues of mechanical processing and possibly at a later stage in an aqueous solution containing acids, such as for example citric acid, in order to remove possible residues of free iron.

The method also comprises a step for preparing a digital apparatus or printer for inkjet printing.

Also one or more digital images must be prepared, to be printed on the metallic interconnector or support 1. Such image or images can also comprise different colors, to be applied by means of different inks, both on the air side and on the fuel side.

Then, the inks must also be prepared, and the optimal operating parameters must be set for the printer machine.

Such step can also provide for handling and movement of the pieces (interconnectors) and for the alignment of the printing heads above a respective face of such pieces.

More in detail, this step can also provide for locking the piece, for example on a printing tray, and preheating it, for example between 40° and 150° C., and then printing one or more digital images on the surface 1a and/or 1b of the metallic interconnector 1 by applying one or more layers of ink with ceramic material base on such surface 1a, 1b.

Such digital images are such to reproduce the layer 10, 10a, 10b or possible other layers to be applied on the metallic interconnector, in particular between the layer 8 and the interconnector or between the layer 9 and the interconnector.

If multiple layers of equivalent or different materials must be applied, the same can be applied simultaneously. This is clearly applied to the case in which it is not necessary to apply an ink layer on a previously-applied layer; in such case, the application will be consecutive and will take place in different steps. This can be attained with a single-pass printer. In this case, different layers can be printed consecutively by two different heads in the same printing process.

Then, the solvent of the ink or inks applied during the printing step can be evaporated or allowed to evaporate, for example between about 40° C. and about 120° C. and, if necessary, the piece 1 is rotated and the loading is repeated in order to print on the opposite side 1b, 1a. In order to accelerate the drying of the deposited material, it is possible to pre-arrange a slightly-ventilated post-heating.

Following the printing, a step is provided for heating, for example at high temperature, if desired between about 600° C. and about 1000° C., the printed metallic interconnector 1, so as to remove the organic part of the ink and allow the adhesion of the material layer on the metallic support.

The organic part can comprise organic solvents of the glycol-ether family, having boiling temperatures comprised between 150° C. and 210° C. and "evaporation rate">0.01 (n-BuAc=1).

Such step can be conducted by drying and sintering, as indicated above in an oven, the piece 1 so as to cook it by means of a suitable thermal cycle for removing the organic residues of the ink and for allowing the material to bind to the metallic surface and form a dense layer. More particularly, during such step, the interconnector is placed in an oven and a sintering cycle is executed, for example up to about 950° C. The organic binders burn at about 300-450° C., while the temperature of 950° C. is necessary for allowing the adhesion of the layer on the steel of the interconnector and the increase of the density of the layer itself. This process is typically carried out in an oven, where only the interconnector is sintered. This step could also be conducted in situ in the final step of stack construction.

Preferably, the image comprises at least one first image for the first side 1a of the interconnector 1 and at least one second image for the second side 1b of the interconnector 1 and during the printing step the first image is printed on the first surface 1a and the second image is printed subsequently or previously on the second surface 1b of the interconnector. Clearly, the first image and the second image are obtained by means of different printing steps.

On such matter, a first image could for example correspond with the layer between the layers 8 and 9 and the interconnector and a second image with the layer 10, 10a, 10b. Multiple first images could be applied in one or multiple subsequent steps, each corresponding to the layer between the layer 8 or 9 and the interconnector or to parts thereof and multiple second images could be applied in one or multiple subsequent steps, each corresponding to the layer 10, 10a, 10b or to parts thereof.

Hereinbelow, the inks or layers applicable in a method according to the present invention will be indicated in detail.

First, with reference to the conductive ink usable in a method according to the present invention, this can be composed of oxides of copper, manganese, cobalt, nickel, iron, niobium and is preferably a mixed copper-manganese oxide. Such mixed oxide can have different stoichiometries, such as $CuMn_2O_4$, or $Cu_{1.3}Mn_{1.7}O_4$. Such ink is in particular usable for the conductive layer 10, 10a, even if it can also be used on the contact area 2.

The insulating ink usable in a method according to the present invention can instead be mainly composed of a refractory oxide belonging to the group composed of aluminum, zirconium, titanium, silicon, barium, strontium, lanthanum, cerium, yttrium, magnesium, calcium, zinc and phosphorus. Such ink can be composed of oxides of the abovementioned elements, or by salts, precursors (e.g. tetraethyl orthosilicate), or by elements in elementary form (e.g. aluminum). This ink can also be a mixture of a vitreous material and of other oxides, giving rise, following thermal treatment, to a composite material. This ink serves for making an insulating layer to be applied over the entire area of the interconnector 1, except for the contact area 2 and the crests 7. Preferably, such layer is applied on the edge portion 1e1, at the perimeter 2a of the contact area 2 and on the ring zone 4a delimiting each hole 4.

The insulating ink can also be composed of a vitreous material or glass-ceramic material composed of powders of a vitreous material which, following thermal treatment, partially or completely crystallizes, forming a so-called glass-ceramic material. This material can be composed of silicon, boron, aluminum, magnesium, calcium, barium, strontium, phosphorus, zinc, yttrium, cerium, titanium. This ink is applied as an alternative or in addition to the ink indicated in the preceding paragraph (refractory oxide) and constitutes an insulating layer. This ink serves for making an insulating layer to be applied over the entire area of the interconnector 1 except for the contact area 2 and the crests 7. Preferably, such layer is applied on the edge portion 1e1, at the perimeter 2a of the contact area 2 and on the ring zone 4a delimiting each hole 4.

An ink layer applicable by means of inkjet printing according to the present invention can also comprise a ceramic material layer with electrical conduction and anti-corrosion protective properties, for example electrical conductivity $\sigma=1$-250 Scm−1 in air at 750° C. or better yet $\sigma=60$-225 Scm−1, such ceramic material being constituted by an oxide of spinel type composed of one or more elements selected from the group constituted by copper, manganese, iron, cobalt, nickel, niobium, or mixtures thereof. This layer can be in particular applied on the crests 7, even if it can be applied over the entire corrugated area 5 or on other surfaces of the edge portions 1e1, 1e2. The oxide of spinel type has general formula $A_{1+x}B_{2-x}O_4$, where both A and B can be one or more elements of the transition metal group, such as Mn, Ti, Fe, Cr, Co, Cu, Ni, Nb. Such material is preferably but not exclusively an oxide with composition $CuMn_2O_4$ or $Co_2MnO_4$.

If desired, an ink layer applicable by means of inkjet printing according to the present invention can comprise a ceramic material layer with electrical conduction and anti-corrosion protective properties, constituted by an oxide of perovskite type with general formula $ABMO_3$, where A is an element belonging to the rare-earth group (e.g. A=La, Nd, Pr) which can be entirely or partly substituted by an element B belonging to the alkaline-earth metal group (e.g. B=r, Ca, Ba, Mg), and M is a transition metal (e.g. M=Mn, Ti, Fe, Cr, Co, Cu, Ni). Such material is preferably but not exclusively an oxide with composition $SrTiO_3$, or $LaCrO_3$ or $LaMnO_3$ or $La_{0.7}Sr_{0.3}MnO_3$. This layer can be applied in particular on the contact area 2, even if it can be applied on the crests 7 as well as over the entire corrugated area 5 or on other surfaces of the edge portions 1e1, 1e2. If desired, this layer can be applied in combination with the layer constituted by an oxide of spinel type described in the preceding paragraph.

If desired, an ink layer applicable by means of inkjet printing according to the present invention can comprise a ceramic material layer set to be transformed into an electrically conductive layer via reaction with the metallic support at high temperature, such ceramic material being selected from the group constituted by lanthanum, cerium, yttrium, strontium, titanium, niobium, phosphorus, zinc or mixtures thereof. These elements, in the form of oxides or salts, can be applied between the steel of the interconnector and the conductive layer. The area of greater interest for the application of one such layer are the crests 7 or the entire corrugated zone 5, but there are no contraindications for applying it over the entire surface which will be covered with the conductive layer.

If desired, an ink layer applicable by means of inkjet printing according to the present invention comprises a ceramic material with electrical insulation and anti-corrosion protective properties, for example with electrical resistance $R>2$ kOhm·cm$^2$ at 750° C., such ceramic material being selected from the group constituted by aluminum oxide, silicon oxide and/or zirconium oxide, phosphorus oxide and by a vitreous phase. This layer is preferably applied below the layers of cord 8, 9, but it can also be applied over all the surfaces except for the contact area 2 and the crests 7. Preferably, such layer is applied at the perimeter 2a of the contact area 2 and on the ring zone 4a delimiting each hole 4.

An ink layer applicable by means of inkjet printing according to the present invention can then comprise a salt or an organometallic precursor which, following thermal treatment, is transformed into an insulating metallic oxide with anti-corrosive barrier properties against the diffusion of elements, for example with electrical resistance $R>2$ kOhm·cm$^2$ at 750° C.

If desired, an ink layer applicable by means of inkjet printing according to the present invention comprises a vitreous material or glass-ceramic material with electrical insulation and anti-corrosion protective properties, such ceramic material being selected from the group constituted by barium, silicon, boron, magnesium, aluminum, strontium, calcium, phosphorus, yttrium and/or cerium.

An ink layer applicable by means of inkjet printing according to the present invention can then comprise a metallic material with electrical conductor and anti-corrosion protective properties in reducing atmosphere, such material being selected from the group constituted by nickel, copper, manganese, iron, cobalt, niobium, titanium.

If desired, an ink layer applicable by means of inkjet printing according to the present invention comprises a first thin layer composed of lanthanum and cerium in contact with the metallic interconnector and a layer of greater thickness composed of copper and manganese, applied above first layer. This ink is applicable in particular on the area of contact with the electrodes, in particular the contact area 2, the area of the crests 7 or the channel-like or corrugated structure 5.

There are multiple technical advantages conferred by this method.

Unlike other coating techniques, this method allows considerably eliminating or reducing the waste of material, since the percentage of overspray is practically zero. This allows employing low quantities of protective material with respect to other deposition technologies.

In addition, due to the high resolution obtainable by means of an inkjet printing, this method allows extreme flexibility in the deposition of layers with geometry that is even quite complex, and it does not require masking the piece or interconnector if materials of different type are printed.

This method also allows depositing successive layers of different composition in order to create a composition gradient within the protective coating. The gradient coating, constituted by a specific number of thin layers or by a protective layer of greater thickness, can be deposited in a single printing step, without requiring intermediate handling of the piece.

A method according to the present invention can also comprise a step of heat treatment of the metallic support 1, e.g. between about 40° C. and about 150° C., in order to facilitate the evaporation of the solvent contained in the ink.

After the printing and drying, the interconnector can be inserted in an oven where a thermal cycle in air is executed up to about 950° C.

Thus, in such a manner it was possible to verify that the invention attains the proposed objects.

The method according to the invention, due to the characteristics of inkjet printing technology, allows selectively depositing, on the metallic interconnector of the stack of fuel cells, an anti-corrosion protective ceramic material layer, also in an effective and inexpensive manner.

As stated above, the deposition is selective in the sense that it accurately reproduces the distribution of the material according to the constructed digital image.

Hence, the problems relative to the corrosion of all the metallic parts of the single repeating element are effectively eliminated—such parts exposed to the gas flow—even if such parts have complex geometry.

It is specified that the present invention can be applied both in the field of fuel cells and in that of cells for electrolysis, so that each time in the present description reference is made for example to the application of a stack of fuel cells, it must be intended that the same concepts can be applied to stacks of cells for electrolysis without any limitation.

As can be verified, due to the method according to the present invention it is possible to print different materials on areas of the interconnector that must perform one or more of the above-described objects.

With this method it is possible, for example, to apply a conductive coating (e.g. copper-manganese oxide) only on the contact area between metal and electrode, an insulating layer (e.g. aluminum oxide, zirconium oxide or a glass-ceramic material) on the contact area between the metal and the sealant material, an insulating coating within the gas distribution channels and over the entire surface not covered with other materials.

In addition, the applied insulating material layer has barrier function and improves the compatibility and adhesion between the sealant and the steel of the interconnector.

It is important to observe that by means of the method according to the present invention, it is possible to apply multiple layers of material simultaneously, without having to mask the piece and without requiring intermediate handling operations.

Modifications and variations of the invention are possible within the protective scope defined by the claims.

The invention claimed is:

1. A method for depositing a material layer on a metallic interconnector for fuel cells, comprising the following steps of:
    preparing a first surface of a metallic interconnector configured to come into contact with fuel, and a second surface configured to come into contact with air;
    preparing a digital apparatus for inkjet printing;
    preparing at least one first digital image to be printed on said metallic interconnector corresponding with the first surface of the metallic interconnector;
    preparing at least one second digital image to be printed on said metallic interconnector corresponding with the second surface;
    printing, by means of said digital apparatus, said at least one first digital image on said first surface of said metallic interconnector and said at least one second digital image on said second surface of said metallic interconnector by applying at least one layer of ink comprising a conductive material layer and/or an insulating material layer on at least one of such respective surfaces;
    evaporating the solvent of the ink applied during the printing step, or allowing such solvent to evaporate;
    heating said printed metallic interconnector, so as to remove an organic part of the ink and allow the adhesion of the material layer on the metallic support,
    wherein said first surface of the metallic interconnector is for contacting during use, at a respective intermediate portion with the fuel and wherein the second surface is for contacting during use, with air, said metallic interconnector also comprising an edge portion extended around said intermediate portion, the edge portion having edge zones in which through slots or holes are delimited, and wherein the edge zones of said first side belonging to the intermediate portion comprise a contact area on which, during use, the fuel cell is positioned on the side exposed to the fuel, such contact area for electrically connecting the fuel-electrode to the metallic interconnector and for collecting the current generated by the oxidation reaction of the fuel in the respective cell, and
    wherein the second side of the metallic interconnector comprises a corrugated structure for distributing air on the surface of the electrode, said corrugated structure comprising crests which come into contact with the air-electrode alternated with channels which distribute the air between the interconnector and the electrode,
    and wherein during said printing step the crests are printed or coated with the conductive material layer and the channels are printed or coated with the insulating material layer simultaneously.

2. The method according to claim 1, wherein said at least one ink layer comprises a ceramic material layer with electrical conduction and anti-corrosion protection properties, such ceramic material being constituted by an oxide of spinel type with general formula $A_{1+x}B_{2-x}O_4$, where both A and B can be one or more elements of the group of transition metals, such as Mn, Ti, Fe, Cr, Co, Cu, Ni, Nb.

3. The method according to claim 1, wherein said at least one ink layer comprises a ceramic material layer with electrical conduction and anti-corrosion protection properties, such ceramic material being constituted by an oxide of perovskite type with general formula $ABMO_3$, where A is an element belonging to the group of the rare earth elements which can be entirely or partly substituted by an element B belonging to the group of alkaline earth metals, and M is a transition metal.

4. The method according to claim 1, wherein said at least one ink layer comprises a ceramic material layer with electrical conduction and anti-corrosion protection properties, such ceramic material being constituted by salts or other precursors which, via reaction, form an oxide of perovskite type or an oxide of spinel type with electrical conduction and anti-corrosion protection properties, such layer comprising salts of copper, cobalt, manganese, iron, nickel titanium, lanthanum, strontium, calcium, barium, magnesium.

5. The method according to claim 1, wherein said at least one ink layer comprises a ceramic material layer with electrical conduction and anti-corrosion protection properties, such ceramic material being constituted by metals which, via reaction, form an oxide of spinel type with electrical conduction or anti-corrosion protective properties, such layer comprising copper, cobalt, manganese, iron, nickel, titanium.

6. The method according to claim 1, wherein said at least one ink layer comprises a ceramic material layer with electrical conduction and anti-corrosion protective properties, such ceramic material being constituted by salts or other precursors which, via reaction with the steel of the interconnector, form oxides with electrical conduction or anti-corrosion protective properties, such layer comprising salts or oxides of lanthanum, strontium, cerium, yttrium, niobium, cobalt, copper, manganese, titanium, phosphorus, zinc.

7. The method according to claim 1, wherein said at least one ink layer comprises at least two ceramic material layers with electrical conduction and anti-corrosion protection properties comprising a layer of oxide of spinel type and a layer of an oxide of perovskite type.

8. The method according to claim 1, wherein said at least one ink layer comprises a refractory ceramic material with electrical insulation and anti-corrosion protective properties, such ceramic material being selected from the group constituted by aluminum oxide, silicon oxide, zirconium oxide, phosphorus oxide or mixtures thereof.

9. The method according to claim 1, wherein said at least one ink layer comprises a composite material with electrical insulation and anti-corrosion protective properties, such composite material comprising a mixture of oxides and a vitreous phase.

10. The method according to claim 1, wherein said at least one ink layer comprises a precursor which, following the step of heating, is transformed into an insulating metallic oxide with anti-corrosive barrier properties against the diffusion of elements, such precursor comprising aluminum which, following the step of heating, is transformed into aluminum oxide.

11. The method according to claim 1, wherein said at least one ink layer comprises a vitreous or glass-ceramic material with electrical insulation and anti-corrosion protective properties, such vitreous or glass-ceramic material comprising barium, silicon, boron, magnesium, aluminum calcium, strontium, phosphorus, yttrium, lanthanum, cerium.

12. The method according to claim 1, wherein said at least one ink layer with electrical insulation and anti-corrosion protective properties comprises at least two layers comprising a layer of aluminum oxide or zirconium oxide or by a glass-ceramic material layer.

13. The method of claim 1, wherein the conductive material layer comprises an oxide of spinel type including $CuMn_2O_4$ or $Co_2MnO_4$ or an oxide of perovskite type including $LaMnO_3$ or $LaCrO_3$.

14. The method of claim 1, wherein the insulating material layer comprises glass-ceramic or aluminum oxide, zirconium oxide or a mixture of these materials.

15. A method for depositing a material layer on a metallic interconnector for fuel cells, comprising the following steps of:
preparing a first surface of a metallic interconnector configured to come into contact with fuel, and a second surface configured to come into contact with air;
preparing a digital apparatus for inkjet printing;
preparing at least one first digital image to be printed on said metallic interconnector corresponding with the first surface of the metallic interconnector;
preparing at least one second digital image to be printed on said metallic interconnector corresponding with the second surface;
printing, by means of said digital apparatus, said at least one first digital image on said first surface of said metallic interconnector and said at least one second digital image on said second surface of said metallic interconnector by applying at least one layer of ink comprising a conductive material layer and/or an insulating material layer on at least one of such respective surfaces;
evaporating the solvent of the ink applied during the printing step, or allowing such solvent to evaporate;
heating said printed metallic interconnector, so as to remove an organic part of the ink and allow the adhesion of the material layer on the metallic support,
wherein said first surface of the metallic interconnector is for contacting during use, at a respective intermediate portion with the fuel and wherein the second surface is for contacting during use, with air, said metallic interconnector also comprising an edge portion extended around said intermediate portion, the edge portion having edge zones in which through slots or holes are delimited, and wherein the edge zones of said first side belonging to the intermediate portion comprise a contact area on which, during use, the fuel cell is positioned on the side exposed to the fuel, such contact area for electrically connecting the fuel-electrode to the metallic interconnector and for collecting the current generated by the oxidation reaction of the fuel in the respective cell,
wherein the second side of the metallic interconnector comprises a corrugated structure for distributing air on the surface of the electrode, said corrugated structure comprising crests which come into contact with the air-electrode alternated with channels which distribute the air between the interconnector and the electrode, and
wherein said printing step comprises
material layers comprising different materials being simultaneously printed on the metallic interconnector.

* * * * *